Patented Mar. 17, 1931

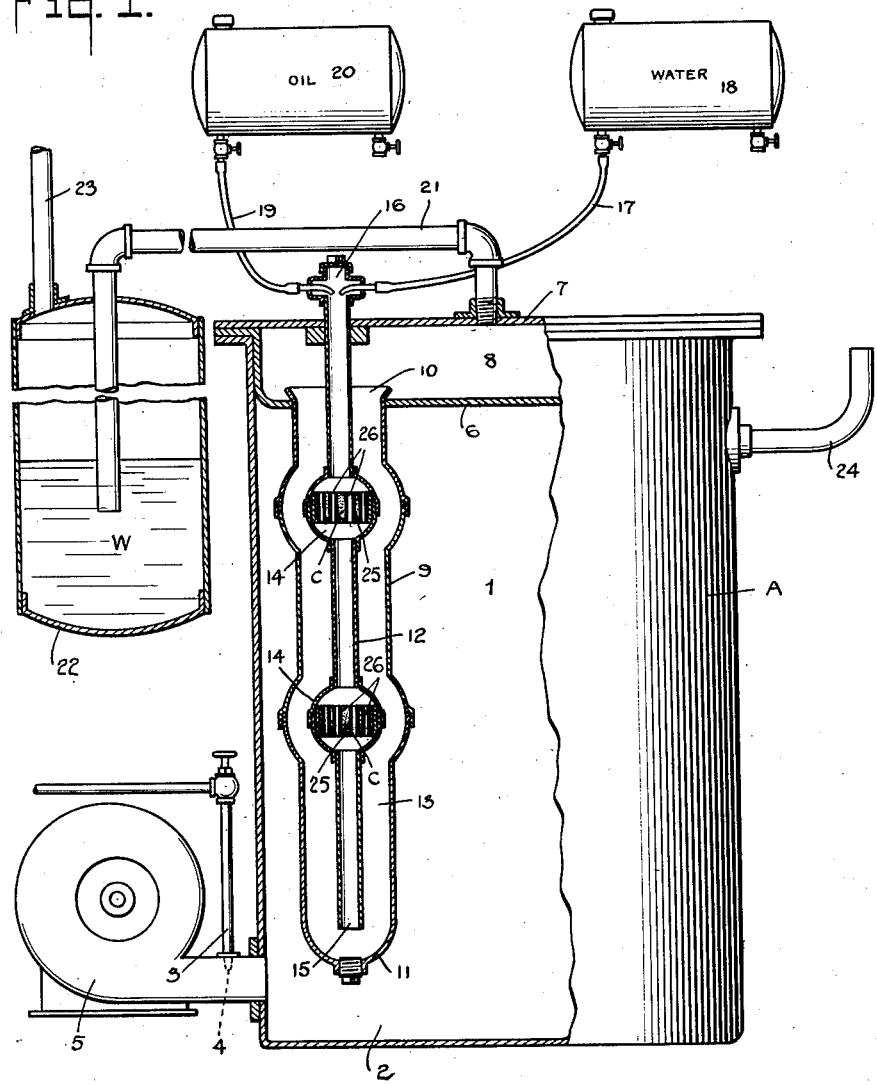

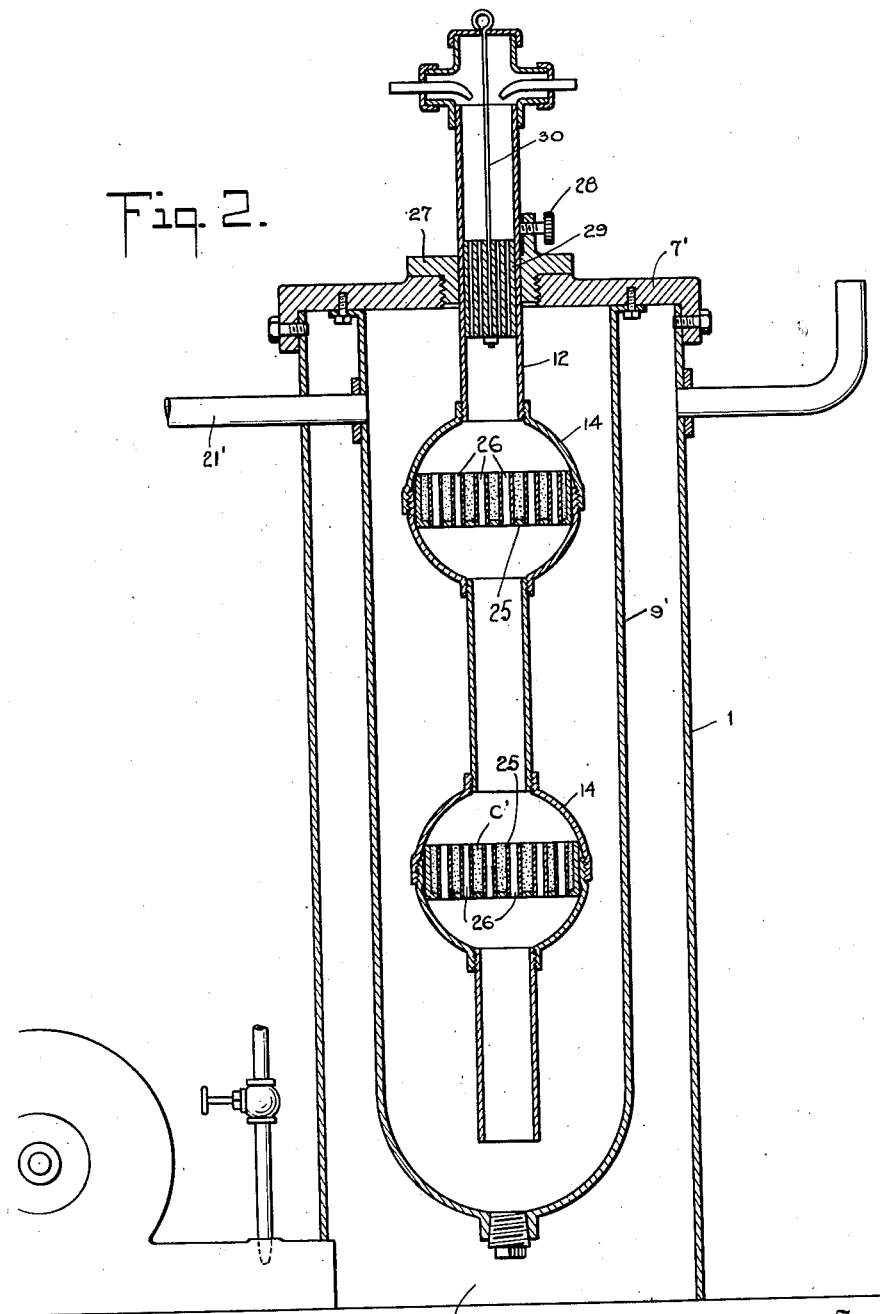

1,796,299

UNITED STATES PATENT OFFICE

FRANK J. NOLAN, OF NEW YORK, N. Y.

PROCESS OF MANUFACTURING OIL GAS

Application filed July 23, 1928. Serial No. 294,889.

This invention relates to the manufacture of gas and has particular application to the production of gas by or through the disassociation of oil and water.

In the present instance it is my purpose to produce a gas having an exceedingly high B. t. u. content, as well as great combustible properties.

It is also my purpose to produce such gas by the use of certain catalytic agents which will accelerate the action and cause complete disassociation of the vapors and their recombination to form a gas which, under normal conditions, is not subject to precipitation, liquefaction and condensation, but which will remain as a substantially free gas.

Furthermore, it is my purpose to produce a gas which, when used for heating or lighting purposes, will burn without the production of carbon or other deleterious products of combustion.

Another object of my invention is the production of a gas which possesses such high calorific value that it is particularly useful in the industrial arts, such as for welding, cutting and brazing metals, as a fuel for internal combustion engines, furnaces, and under other conditions where an economic and efficient fuel is desired.

With the above recited objects and others of a similar nature in view, my invention consists in the method of manufacturing gas, and in the apparatus set forth in and falling within the scope of the appended claims.

In the accompanying drawings—

Fig. 1 is a view partly in elevation and partly in section of an oil gas manufacturing apparatus embodying my invention;

Fig. 2 is a vertical cross-sectional view of a slightly modified form of apparatus.

It is well known that when a mixture of water and oil is subjected to a very high temperature, disassociation occurs, resulting in the production of a combustible gas. However, the methods of manufacturing such a gas, as heretofore practiced, has certain disadvantages. For example, in the manufacture of the gas itself, the generator is liable to become clogged or coated with undesirable residue, such as carbon, and furthermore, when the gas is consumed, it leaves deleterious products of combustion, including carbon and other substances. This is indicative, not only of incomplete gasification, but of loss of desirable calorific values or heat units. In other words, the prior methods, to my knowledge, have resulted in the production of which might be called poor gas, deficient in heat values, and producing excess carbonization.

With the present invention I have obviated these disadvantages and obtained a clean, high grade gas which may be manufactured under most economic conditions.

Generally speaking, I produce my gas by subjecting the mixture of oil and water to a high degree of heat to vaporize constituent fluids, and such vapors are then passed over or brought into contact with a suitable catalytic agent which not only accelerates the action, but causes a complete disassociation of the vapors and a recombination to form a gas normally incapable of condensation and having high combustible properties.

I have herein shown and described one apparatus by means of which the method of manufacturing my gas may be carried out, but it will of course be understood that the invention is not limited in its useful application to the employment of this particular form or type of apparatus.

Referring now to the accompanying drawings in detail the letter A indicates the gas generator as an entirety, and this comprises a suitable generator casing 1, formed of steel, or other suitable materials, the lower portion 2 of which forms a combustion chamber. Fuel is supplied to this chamber, in the present instance, in the form of oil passing through the valve-controlled pipe 3, provided with a nozzle 4, while 5 indicates a suitable air blower which presses or atomizes the oil and injects the mixture into the chamber in the form of a spray, the mixture being ignited in the chamber in any suitable and well known manner. The upper portion of the casing 1 is provided with a suitable header 6 spaced apart from cover 7 of the generator casing, so as to form a chamber 8. Suspended from the header 6, and depending into the casing 1 is a tube 9 of relatively wide cross diameter and preferably of bulb construction, having an upper open end 10, which communicates with the chamber 8, and having a closed lower end 11, which depends into the combustion chamber section of the casing. Extending through the cover 7 of the casing and depending into the large tube 9, is a second tube 12, relatively small in cross diameter so that a space 13 is formed between the small tube 12 and its enveloping tube 9. This inner tube 12 is preferably formed of a number of pipe sections, the contiguous ends of which are joined by unions in the form of hollow balls or bulb-like members 14 which constitute containers for holding the catalytic agents, as hereinafter described.

The lower end of the inner tube 12 is open as at 15 and terminates a short distance above the closed bottom 11 of the outer or large tube 9. The upper end of the inner tube 12, which projects through the cover 7 of the generator casing is closed, and is in the form of a small mixing chamber 16 into which water is fed through a pipe 17 from the water tank 18, and into which pipe the oil is fed through a pipe 19 from the oil tank 20. Communicating with the gas chamber 8 at the top of the casing, is a gas outlet pipe 21 preferably leading to a gas holder comprising a tank 22, adapted to be partially filled with water as at W, the discharge end of the gas outlet 21 projecting into the water, so that the latter forms a water seal. From this tank 22 leads a suitable gas pipe 23, through which the manufactured oil gas is conducted to a compressor (not shown) where, as usual, it is compressed and then discharged into a suitable storage tank.

The products of combustion from the combustion chamber are discharged through a suitable chimney or flue 24.

I will now proceed to describe the arrangement of the catalytic agents in the generator and the composition of such agents.

As will be seen by reference to the drawings, the catalytic agents are housed within the ball-like unions 14 of the inner pipe 12. It will be noted that each hollow ball union 14 is formed of two hemispherical sections. Within each union is suspended a basket-like container 25 conforming in cross diameter to the union or housing so as to fit snugly therein. Each basket has mounted therein a series of short vertically disposed spaced tubes 26, which open through the bottom of the basket so that gas passages are formed through the basket. Within the basket the spaces between the tubes are filled with the catalyst or catalytic agent indicated at c.

One catalyst which I have found particularly efficient and useful for my purpose is a composition of aluminum 50%, nickel 15%, copper 10%, titanium 10%, silver 2%, magnesium 10% and bismuth 3%. I use two ounces of potassium bichromate to each twenty pounds of the metal catalyst. If desired, about one-quarter of an ounce of silicon may be added to the molten metal to prevent corrosion after casting. I might mention that this catalytic composition, when subjected to heat of say, 1200° F., will maintain its solid form, but when the temperature to which it is subjected reaches, for example, 1400° F., it will assume a partially fluxed or semi-solid condition, while when subjected to the temperature of approximately 1600° F., it will flux or assume a liquid form, and at such time will give off vapors.

The above is a description of the mechanical construction of my gas generator, and the process of manufacturing the gas is as follows:

The liquid fuel mixture is admitted to the combustion chamber and ignited in the usual manner. When the generator has been preliminarily heated to a suitable temperature, say, 900° F. at the top, and 1400° F. in the zone of the combustion chamber, it is ready for the reception of the oil and water to form the gas, but it will be understood from this time on the heating of the generator progresses, being thermostatically controlled, until in normal operation the temperature at the top of the generator is, say, 1200° F., at the first housing for the catalyst 1400 F., at the second catalyst housing 1600° F., and at the combustion chamber or bottom reaches a temperature of 2000° F. Oil and water are now admitted to the mixing chamber 16, where they are mixed and flow down through the inner tube. When the mixture strikes the zone at the header where the temperature is about 1200° F., it is gasified, and the gases then flowing down through the inner tube, pass through the first catalyst-holding basket and in contact with the catalyst therein, the latter being in a substantially solid state. The gases continue in their travel down through the inner tube, then pass through the second catalyst-holding basket, and in contact with the catalyst, which at this point is in a substantially melted or fluid condition. So far as I understand the action of the catalyst upon the gases, it appears that it results not only in the acceleration of the gas manufacture, but realigns and recombines the molecules, and fixes the gas, so that it is not subject to precipitation and condensation. In other words, it appears that the catalyst so fixes the gas that the production or generation of carbon and other distillates is avoided when the gas is burned. I have found that the carbon and other distillates are apparently in suspension in the gas, in gaseous combination and not in solid form, so that the gas will burn without carbonizing or leaving any residue, and furthermore, in the manufacture of the gas no such carbon or residue appears in the generator. The gas, after passing through and being subjected to the action of the catalyst, flows out through the open end 15 of the inner tube, and thence passes up in the space between the inner and outer tube to the chamber 8 formed by the header at the top of the generator. From this point the gas is conducted through the pipe 21 through the gas holder W and thence through the pipe 23 to a point of storage or use.

Of course, the products of combustion resulting from the burning of the fuel within the combustion chamber of the generator pass out through the flue or chamber pipe 24.

I might mention, that so far as I understand it, the action of the catalyst prevents substances having high calorific values, from being distilled out or precipitated from the gases, that is to say, it holds these substances in gaseous form in suspension in the gas where they will be consumed in the utilization of the heat units, instead of such heat being wasted, as would occur were they precipitated out as liquids or solids. Tests and analyses made with my gas, show, that when I use the catalyst, as herein described, not only do I obtain a clean gas which in both generation and burning is free from distillation and precipitation of substances, but I obtain far greater or higher heat values than possible where the gas is manufactured without the use of the catalyst.

In Fig. 2 I have shown a slightly modified form of the apparatus, in that the provision of the header and gas chamber 8 at the top of the generator is omitted and the outer tube 9′ is bolted directly to a cover 7′. A gland nut 27 is threaded into the cover 7′ and through this extends the inner tube 13, a suitable set screw 28 holding the tube 13 in the gland nut. A cylindrical basket 29 constructed on the same general principles as the catalyst-holding baskets heretofore described, and containing the catalyst, is located within the tube 12 at the gland nut and is suspended by means of a rod 30. The oil gas discharge pipe 21′ leads direct from the cylindrical outer tube 9′ to a gas holder similar to that shown at 22.

The construction and manner of employing the generator shown in Fig. 2 is identical with that shown in Fig. 1, except that the catalytic bodies are so located at the inner tube and the temperatures are so adjusted that the catalytic material in the basket 29 is maintained in substantially solid form, while the next lower catalytic body is in a semi-solid form, and the lowermost catalytic body is in the fluxed or fluid-like form.

With reference to the composition of the catalyst it will be understood that the proportions may be varied as desired. For instance, a variation of 15 or 20% in the percentages given will not seriously affect the melting points of the constituents and hence not affect their action as a catalyst. Further departure from the percentages named, however, will affect the alloyed state of the catalyst and hence bring about a disintegration such that the process will be adversely affected in more or less proportion to such variation. It is further to be understood that the temperatures within the generator, being thermostatically controlled, may be maintained at the desired degree suitable to the conditions under which the gas is being manufactured.

Under some conditions it may be desirable to remove carbon dioxide from the gas, and under such conditions, this can be readily accomplished by passing the gas through a solution of potassium chloride.

If it be desirable to remove certain illuminants from gas such, for example, as ethylene, methane, ethane, and the like, this may be done by passing the gas through a tower counter-current to a stream of fuming sulphuric acid. Likewise, oxygen may be removed from the gas by absorption with alkaline pyrogallol, and carbon monoxide may be eliminated through removal and absorption by ammoniacal cuprous chloride.

To remove nitrogen from the gas, I may pass the gas through charcoal at a temperature of 130° F., which will absorb twenty times its own weight in water and one hundred twenty times in volume, and I may also use a filter of stranded hemp rope in the process. I may also use a tray of glycerine, absorbing the nitrogen and forming nitroglycerine.

While I have herein shown and described a preferred embodiment of my invention, I wish it to be understood that I do not confine myself to all the precise details herein set forth by way of illustration, as modification and variation may be made without departing from the spirit of the invention or exceeding the scope of the appended claims.

What I claim is:

1. The process of manufacturing oil gas, which consists in conducting water and liquid hydrocarbons into a zone heated to a temperature of approximately 1200° F., in conducting the resultant vapors and gas without further addition of steam thereto over a metallic catalyst heated to a temperature in excess of 1200° F., in conducting the resultant gas without adding further steam thereto into a further zone heated to a temperature of approximately 1600° F., in then fixing the oil vapors, and withdrawing the gas for collection.

2. The process of manufacturing oil gas, which consists in conducting water and liquid hydrocarbons into a zone heated to a temperature of approximately 1200° F., in conducting the resultant vapors and gas over a catalyst heated to a temperature of approximately 1400° F., in conducting said gas into a further zone heated to approximately 1600° F., then fixing the oil vapors, and in withdrawing said gas from said last named zone for collection.

3. The process of manufacturing oil gas, which consists in conducting water and liquid hydrocarbons into a zone heated to a temperature of approximately 1200° F., in conducting the resultant vapors and gas over a catalyst heated to a temperature of approximately 1400° F., in conducting said gas without further addition of steam thereto into a further zone also having a catalyst therein and heated to a temperature approximating 1600° F., the catalysts in each of said zones comprising metallic alloys, and in withdrawing the gas from said last named zone.

4. The process of manufacturing oil gas, which consists in conducting water and liquid hydrocarbons into a zone heated to a temperature of approximately 1200° F., in conducting the resultant vapors and gas over a catalyst heated to a temperature of approximately 1400° F., in conducting said gas into a further zone also having a catalyst therein and heated to a temperature of approximately 1600° F., in conducting the gas into a further zone heated to a temperature in excess of 1600° F., where fixation of the vapors occurs and in collecting the resultant gas.

5. The process of manufacturing oil gas, which consists in conducting water and liquid hydrocarbons into a zone heated to a temperature of approximately 1200° F., in conducting the resultant vapors and gas over a catalyst heated to a temperature of approximately 1400° F., in conducting said gas into a further zone also having a catalyst therein and heated to a temperature of approximately 1600° F., in conducting the gas into a further zone heated to a temperature of approximately 2000° F. where fixation of the vapors occurs, and in collecting the gas from said last named zone.

6. The process of manufacturing oil gas, which consists in conducting water and liquid hydrocarbons into a zone heated to a temperature of approximately 1200° F., in conducting the resultant vapors and gas over a catalyst heated to a temperature of approximately 1400° F., in conducting said gas into a further zone also having a catalyst therein and heated to a temperature of approximately 1600° F., in conducting the gas into a further zone heated to a temperature of approximately 2000° F. where fixation of the vapors occurs, and in withdrawing the gas thru a water seal before collection for use.

7. The process of manufacturing oil gas, which consists in providing an elongated retort having a temperature gradient between 1200° and 2000° F., in stationing metallic catalysts at different points within said retort for differential heating thereof, in introducing water and liquid hydrocarbon into said retort at the point of lowest temperature thereof, in conducting the resultant gas thru said retort and over said catalysts without the addition of steam thereto, in conducting said gas thru a water seal, and in collecting the gas above said seal.

8. The process of manufacturing oil gas, which consists in introducing a mixture of vaporous hydrocarbons and steam to a zone containing a plurality of individual spaced metallic catalysts each spanning said zone and composed of a metallic alloy heated to a temperature in excess of 1000° F., in passing the mixture successively over each of said catalysts without further addition of steam thereto, and in withdrawing the resultant gas for collection.

9. The process of manufacturing oil gas, which consists in introducing a mxture of vaporous hydrocarbons and steam to a metallic catalyst containing aluminum and nickel and heated to a temperature of approximately 1400° F., in conducting the vapors and gas to another zone having a metallic catalyst therein of similar composition to said first named catalyst and heated to a temperature of approximately 1600° F. for completing the vaporization, in fixing, and in collecting the gas from said last-named zone.

10. The process of manufacturing oil gas, which consists in introducing a mixture of vaporous hydrocarbons and steam to a zone containing metallic catalyst containing aluminum and nickel and heated to a temperature immediately below its melting point, in conducting the gas to a second zone having a catalyst of similar composition to said first named catalyst, said second catalyst being heated to the melting point, in conducting the gas to a fixing zone having a higher temperature than that of either of said zones, and in collecting the gas from said last-named zone.

11. The process of manufacturing oil gas, which consists in introducing a mixture of vaporous hydrocarbons and steam to a metallic catalyst containing a predominance of aluminum and a quantity of copper and nickel and heated to a temperature of approximately 1400° F., in conducting the resultant vapors and gas to another zone containing a second catalyst having a similar composition to said first-named catalyst and having a temperature of approximately 1600° F., in conducting the vapors and gas to a zone of approximately 2000° F. for fixation and in collecting the gas for use.

12. The process of manufacturing oil gas, which consists in introducing a mixture of vaporous hydrocarbons and steam to a catalyst containing aluminum and nickel to which a small percentage of potassium bichromate has been added, said catalyst being heated to a temperature of approximately 1400° F., in conducting the resultant vapors and gas to a zone of higher temperature for fixation, and in collecting the gas for use.

13. The process of manufacturing oil gas, which consists in introducng a mxture of vaporous hydrocarbons and steam to a catalyst composed of an alloy of 50% aluminum, 15% of nickel, 10% of copper, 10% of titanium, 2% of silver, 10% of magnesium and 3% of bismuth, said catalyst being heated to a temperature of approximately 1400° F., in conducting the resultant vapors and gas to a zone of higher temperature for fixation, and in collecting the gas for use.

14. The process of manufacturing oil gas, which consists in introducing a mixture of vaporous hydrocarbons and steam to a catalyst composed of an alloy of 50% aluminum, 15% of nickel, 10% copper, 10% of titanium, 2% of silver, 10% of magnesium and 3% of bismuth, to which is added a small percentage of potassium bichromate, said catalyst being heated to a temperature of approximately 1400° F., in conducting the resultant vapors and gas to a zone of higher temperature for fixation, and in collecting the gas for use.

15. The process of manufacturing oil gas, which consists in introducing a mixture of vaporous hydrocarbons and steam to a catalyst composed of an alloy of 50% aluminum, 15% of nickel, 10% of copper, 10% of titanium, 2% of silver, 10% of magnesium and 3% of bismuth, to which is added a small percentage of potassium bichromate and silicon, said catalyst being heated to a temperature of approximately 1400° F., in conducting the resultant vapors and gas to a zone of higher temperatutre for fixation, and in collecting the gas for use.

16. The process of manufacturing oil gas, which consists in introducing a hydrocarbon vapor and steam to a heated zone, in conducting said vapor and steam thru said zone for conversion into vapors and gas, in alternately compressing and expanding said vapors and gas past a plurality of baffles, each of said baffles carrying a catatlyst, said vapors and gas in progressing thru said zone encountering catalysts of temperatures increasing from 1400° F., to 1600° F., in conducting said vapors and gas into a zone heated to approximately 2000° F. for fixation, and in collecting the gas from said last named zone for use.

Signed at New York city, in the county of New York and State of New York, this 12th day of July, A. D., 1928.

FRANK J. NOLAN.